Feb. 26, 1957

A. A. FRENCH ET AL 2,782,608

ICE MAKING APPARATUS

Filed Dec. 3, 1953

INVENTOR
ARTHUR A. FRENCH
AND ARTHUR N. McGREGOR
BY Young, Emery &
Thompson
ATTORNEYS

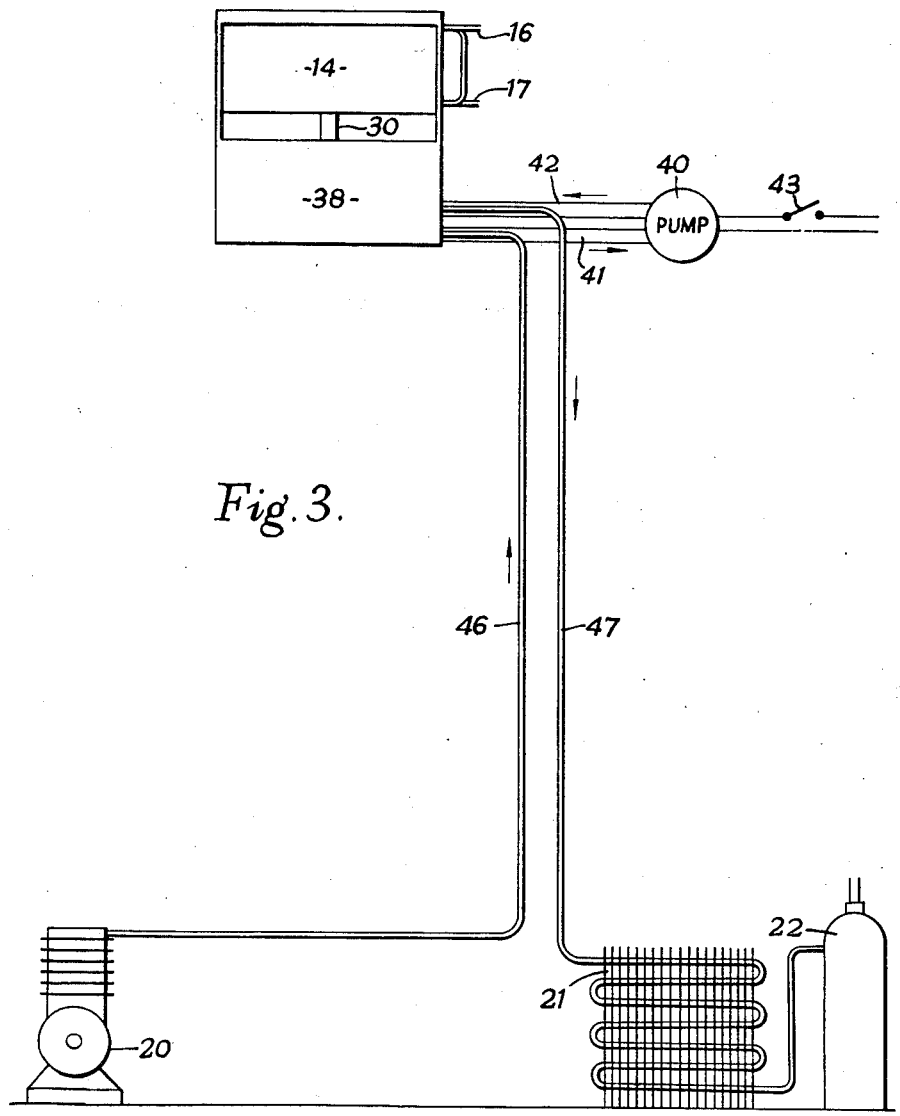

United States Patent Office
2,782,608
Patented Feb. 26, 1957

2,782,608
ICE MAKING APPARATUS

Arthur A. French and Arthur N. McGregor, London, England

Application December 3, 1953, Serial No. 395,925

Claims priority, application Great Britain December 18, 1952

4 Claims. (Cl. 62—106)

This invention relates to refrigeration apparatus for use in producing iced lollies or other blocks of frozen material in moulds.

Freezing is commonly effected by means of a refrigerant such as "freon" (registered trademark) methyl chloride, or ammonia which is circulated in heat exchange relation with metal moulds (or metal mould sheaths in which moulds can be inserted) by means of a compressor, condenser, and liquid refrigerant container. We have found it possible to melt the surface of the frozen blocks in order to remove them from the moulds by circulating the refrigerant to the moulds in comparatively warm condition as it leaves the head of the compressor. Although this method is more or less satisfactory we have now developed a still more effective method and apparatus for accomplishing this result which enables the blocks to be removed in a much shorter period.

According to this invention there is provided a method of forming frozen blocks of material in moulds and then freeing the frozen blocks from the moulds in which they have been frozen, such method comprising circulating a cold refrigerant around the moulds containing the material to be frozen, or around mould sheaths into which the moulds are placed, and, when freeing of the blocks is required, supplying and maintaining a body or envelope of defreezing fluid around the major part of the exterior surfaces of said moulds in heat exchange relationship therewith whilst maintaining a circulation of such defreezing fluid over said surfaces until a superficial melting of the blocks has been effected at said surfaces. Preferably the circulation of the heated defreezing fluid is arranged so as to cause melting of the individual blocks or rows or groups of blocks of frozen material to occur seriatim. Conveniently the defreezing fluid is heated by means of warm refrigerant.

According to a further aspect of this invention there is provided apparatus for use in forming frozen blocks of material in moulds and then freeing the frozen blocks from the moulds in which they have been frozen, such apparatus comprising a mould, or mould sheath, evaporator means mounted in heat exchange relation with said mould, or mould sheath, means for supplying refrigerant to said evaporator means, a receiver for defreezing fluid in which said mould or sheath is permanently located, said receiver being adapted to be supplied with defreezing fluid for superficial melting of the blocks to permit their ready removal from the moulds, and means to supply a body or envelope of defreezing fluid in said receiver around the major part of the surfaces of said moulds in heat exchange relation therewith when freeing of the blocks is required.

The apparatus may include a defreezing fluid tank at a lower level than the receiver, a fluid supply pipe and pump for propelling defreezing fluid from the tank to the receiver when surface melting is required, provision being made for return flow of fluid from the receiver to the tank.

We prefer to heat the fluid in the receiver by means of a pipe or other heat exchange device supplied with the warm refrigerant leaving the head of the compressor before it enters the condenser.

The apparatus in accordance with one constructional form of the invention may be made as shown and described in the complete specification of British application No. 32,323 of 1949 with the modifications illustrated in the accompanying diagrammatic drawings wherein:

Figure 3 is an elevational view of the parts shown in Figures 1 and 2 connected with other parts of the apparatus.

Figure 1:
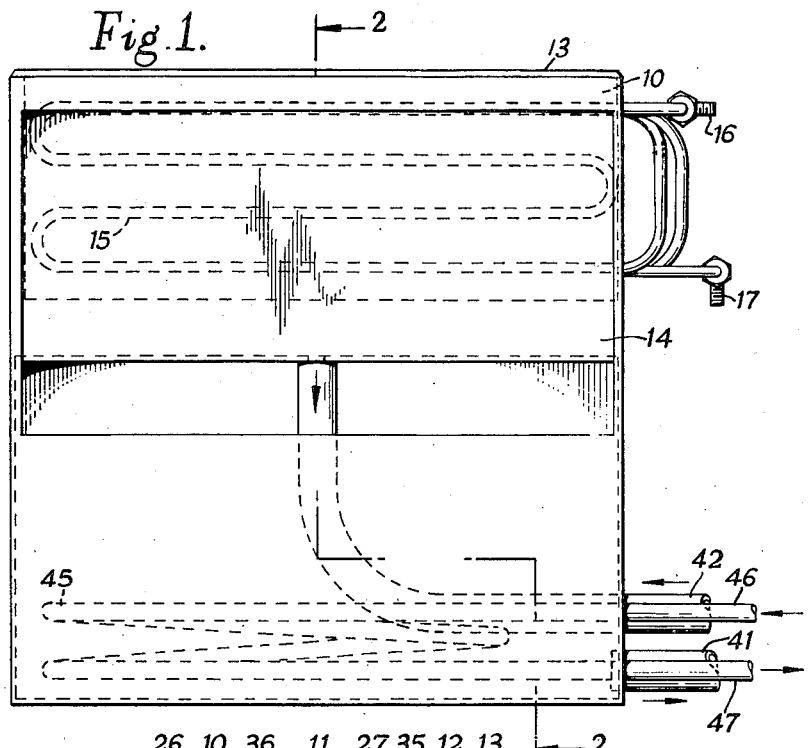
Figure 1 is an elevational view of a part of an apparatus made in accordance with the invention.
Figure 2:
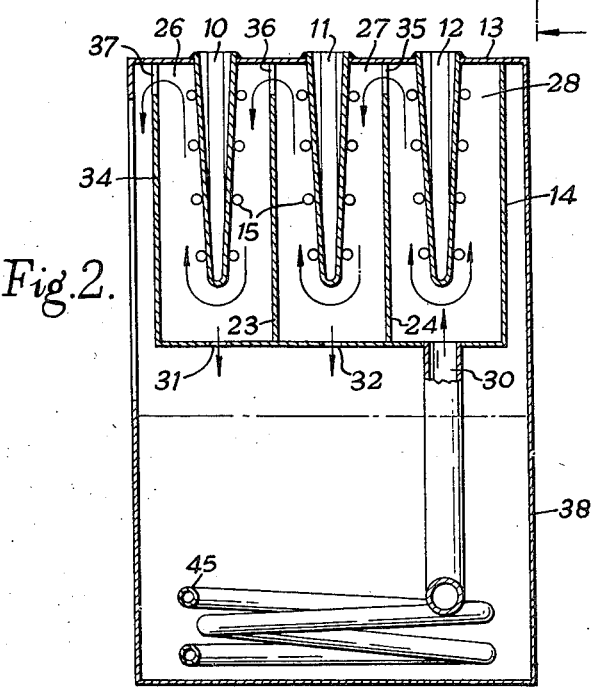
Figure 2 is a sectional view on the line 2—2 on Figure 1.

The apparatus is in general similar to the construction described in the specification of British patent application No. 32,323 of 1949 and only sufficient parts of the complete apparatus are illustrated in the accompanying drawings to enable the present invention to be understood.

Three metal moulds 10, 11, 12 are shown connected at their upper ends to a plate 13. A metal receiver or container 14 is attached by soldering or otherwise to the underside of the plate 13. An evaporator pipe 15 is soldered to the moulds and its inlet and outlet ends 16, 17 are connected with means for supplying a refrigerant or heat exchange medium, said means including a compressor 20, condenser 21, and container 22 for said medium. The pipe 15 passes through the wall of the container 14 with soldering to make the container fluid tight at the entry and exit positions.

The container 14 is provided with partitions 23, 24 parallel to the centre planes of the moulds so that the moulds are in separate compartments 26, 27, 28. The bottom of the container has a fluid inlet pipe 30 connected thereto leading into the compartment 28 and two outlet holes 31, 32 communicating respectively with the compartments 26, 27. Each mould divides its compartment into two sub-compartments which communicate with each other at their lower ends.

The partitions 23, 24 and the wall 34 of the container 14 have openings 35, 36, 37 whereby fluid (e. g. water) can flow from one compartment to the other and finally overflow at 37. Thus fluid entering at 30 flows up both parts of compartment 28 and after filling this compartment overflows at 35 into compartment 27 and after filling this, overflows into compartment 26. Consequently surface melting of the blocks occurs seriatim so that the block from mould 12 can be removed first, then the block from mould 11 and finally the block from mould 10. The fluid supply at 30 is then stopped and the fluid flows out of the holes 31, 32 leaving the compartments 26, 27 empty and out of 30 leaving also the compartment 28 empty. The size of the holes 31, 32 is such as to permit outflow of fluid at a rate less than the rate of inflow at 30.

A fluid tank 38 of ample capacity is mounted directly below the container 14 so as to receive the fluid flowing out at 37, 31, 32. A pump and electric motor unit 40 has an intake pipe 41 connected to the tank and an output pipe 42 which is connected to the inlet pipe 30. The electric motor is controlled by an electric switch 43.

For heating the fluid, a heat exchange device in the form of a coil 45 is provided in the tank 38. This coil is connected by a pipe 46 to the head of the compressor 20 and is connected by a return pipe 47 to the condenser 21.

The comparatively warm refrigerant or heat exchange medium from the head of the compressor is supplied through the pipe 46 to the coil 45 so that the fluid does not become too cold.

A valve is preferably fitted in the line supplying the refrigerant from the container 22 to the evaporator pipe 15 so that freezing of the material in the moulds can be discontinued when the frozen products are being freed from the moulds. This valve may be arranged to close automatically upon actuation of the pump 40 for example it may be operated magnetically through the switch controlling the pumps.

In a modification the partitions 23, 24 are of inverted V-shape, thereby reducing the tank volume and consequently the quantity of fluid required to fill the tank.

We claim:

1. Apparatus for use in forming frozen blocks of material in moulds and then freezing the frozen blocks from the moulds in which they have been frozen, such apparatus comprising a plurality of hollow heat exchange elements open at their upper ends, evaporator pipes mounted in heat exchange relation with said elements, means for supplying refrigerant to said evaporator pipes, a tank for defreezing fluid in which said elements and pipes are permanently located in fixed relation thereto, said tank being adapted to be supplied with defreezing fluid for superficial melting of the blocks, means for mounting the said elements and tank with the open ends of said elements permanently uppermost; means to supply a body of defreezing fluid in said tank around the major part of the surface of said elements and pipes in heat exchange relation therewith when freeing of the blocks is required, means for heating the defreezing fluid, at least one partition between adjacent elements in said receiver and dividing the container into compartments, said partitions having a flow path for the defreezing fluid at the upper parts thereof whereby the defreezing fluid is permitted to flow from one compartment to another to cause the surface melting of the blocks to occur seriatim, and openings for emptying said tank when supply of defreezing fluid thereto ceases.

2. Apparatus according to claim 1, wherein there is provided a reserve tank for defreezing fluid and means for circulating the defrezing fluid from this reserve tank through the defreezing liquid tank in which the elements are located and back to the said reserve tank.

3. Apparatus according to claim 1, wherein there is provided a reserve tank for defreezing fluid and means for circulating the defreezing fluid from this reserve tank through the defreezing liquid tank in which the elements are located and back to the said reserve tank, the reserve tank being mounted immediately below the defreezing fluid tank, a pump for circulating the defreezing fluid, and holes in the said tank for the return flow of defreezing fluid to the said tank.

4. Apparatus according to claim 1, wherein the means for heating the defreezing fluid comprises a heat exchange device supplied with refrigerant in a comparatively hot condition.

References Cited in the file of this patent

UNITED STATES PATENTS

| | | |
|---|---|---|
| 1,921,549 | Spaan | Aug. 8, 1933 |
| 2,133,521 | Wussow | Oct. 18, 1938 |
| 2,226,271 | Vose | Dec. 24, 1940 |
| 2,443,203 | Smith | June 15, 1948 |
| 2,575,892 | Roberts | Nov. 20, 1951 |
| 2,586,588 | Weseman | Feb. 19, 1952 |